(12) United States Patent
Casset

(10) Patent No.: US 11,650,668 B2
(45) Date of Patent: May 16, 2023

(54) FLEXIBLE HAPTIC INTERFACE

(71) Applicant: COMMISSARIAT A L'ENERGIE ATOMIQUE ET AUX ENERGIES ALTERNATIVES, Paris (FR)

(72) Inventor: Fabrice Casset, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/651,444

(22) Filed: Feb. 17, 2022

(65) Prior Publication Data

US 2022/0261081 A1 Aug. 18, 2022

(30) Foreign Application Priority Data

Feb. 18, 2021 (FR) ...................................... 21 01596

(51) Int. Cl.
*G06F 3/01* (2006.01)
*G06F 3/041* (2006.01)

(52) U.S. Cl.
CPC ............ *G06F 3/016* (2013.01); *G06F 3/0412* (2013.01); *G06F 2203/04102* (2013.01); *G06F 2203/04103* (2013.01)

(58) Field of Classification Search
CPC ...... G06F 3/016; G06F 3/0412; G06F 3/0414; G06F 3/044; G06F 2203/04102; G06F 2203/04103
See application file for complete search history.

(56) References Cited

U.S. PATENT DOCUMENTS

| 9,983,673 B2* | 5/2018 | Vertegaal ............... G06F 1/1652 |
| 10,037,660 B2* | 7/2018 | Khoshkava ............. G06F 1/163 |
| 10,234,945 B2* | 3/2019 | Levesque ................ G06F 3/016 |
| 10,240,688 B2 | 3/2019 | Besse et al. |
| 10,510,225 B2* | 12/2019 | Khoshkava ............ H02K 33/16 |
| 2006/0256075 A1 | 11/2006 | Anastas et al. |
| 2010/0207878 A1* | 8/2010 | Nishikawa .......... H01L 51/5265 313/1 |
| 2011/0043474 A1 | 2/2011 | Anastas et al. |

(Continued)

FOREIGN PATENT DOCUMENTS

| EP | 2 381 340 A2 | 10/2011 |
| FR | 3 082 997 A1 | 12/2019 |
| WO | WO 2021/011232 A2 | 1/2021 |

OTHER PUBLICATIONS

French Preliminary Search Report dated Nov. 3, 2021 in French Application 21 01596 filed on Feb. 18, 2021, citing documents AA-AD, AO-AP & AV-AW therein, 4 pages (with English Translation of Categories of Cited Documents).

(Continued)

*Primary Examiner* — Vijay Shankar
(74) *Attorney, Agent, or Firm* — Oblon, McClelland, Maier & Neustadt, L.L.P.

(57) ABSTRACT

A flexible haptic interface including a haptic structure defining a touch surface touchable by a user, the structure including a plurality of stiff touch pixels borne by a flexible carrier, at least one actuator that makes contact with each pixel and that is arranged to transmit, to the pixel, a mechanical excitation that leads to an effect perceptible tactilely by the user.

25 Claims, 18 Drawing Sheets

(56) References Cited

U.S. PATENT DOCUMENTS

2011/0261021 A1* 10/2011 Modarres .............. G06F 3/0414
345/177
2021/0012689 A1 1/2021 Simmons
2021/0392422 A1* 12/2021 Crowley ................ G06F 3/016

OTHER PUBLICATIONS

Yu et al., "Skin-integrated wireless haptic interfaces for virtual and augmented reality", Nature, vol. 575, 2019, 23 pages.

Casset et al., "Low Voltage Actuated Plate for Haptic Applications With PZT Thin-Film", Transducers, 2013, 4 pages.

Lochtefeld, "Towards Real Organic User Interfaces—Using Non-Newtonian Fluids for Self-Actuated Displays", CHI'13 Workshops, 2013, 4 pages.

Poncet et al., "Static and Dynamic Studies of Electro-Active Polymer Actuators and Integration in a Demonstrator", Actuators, 2017, 10 pages.

Poncet et al., "Design and realization of electroactive polymer actuators for transparent and flexible haptic feedback interfaces", 2016, 17$^{th}$ International Conference on Thermal, Mechanical and Multi-Physics Simulation and Experiments in Microelectronics and Microsystems, 2016, 5 pages.

* cited by examiner

FLEXIBLE HAPTIC INTERFACE

TECHNICAL FIELD

The present invention relates to human-machine interfaces, and more particularly those producing haptic effects.

PRIOR ART

A haptic interface allows the user to interact with his environment via his sense of touch. At the present time, haptic effects are increasingly being used in many applications, for example in smartphones, the latter generating a slight vibration when a key displayed on the screen is pressed in order to simulate the impression of pressing on a button. Haptic applications also exist in virtual- or augmented-reality devices, in particular in order to allow a better immersion in video games. Haptic interfaces such as touch panels, which generate a haptic effect on a touch surface when a user makes contact therewith, may especially be integrated into many technologies such as desktop or laptop computers, tablet computers and/or smartphones.

It is known to generate various and relatively complex haptic effects on a stiff touch surface by virtue of ultrasonic transducers that emit ultrasonic waves that propagate over the stiff surface.

With the appearance on the market of flexible commercial products, such as foldable smartphones or even rollable television sets, it would be desirable to provide flexible haptic interfaces able to be integrated into such products.

Use of a simple flexible carrier bearing ultrasonic transducers is however limited because the waves emitted by the transducers are partially absorbed by the flexible material; the generated haptic effect is then difficult for a user applying a pressure with his finger or his hand on such a carrier to perceive.

It is moreover known to use a pneumatic actuator to generate haptic effects on a flexible structure. U.S. Ser. No. 10/240,688B2 discloses a flexible haptic interface comprising pneumatic actuators allowing a topology effect to be generated.

The article by Yu et al. "Skin-integrated wireless haptic interfaces for virtual and augmented reality" (Nature, 2019) discloses a flexible haptic interface comprising magnetic actuators allowing various haptic effects to be generated. However, the spatial resolution of the haptic effects obtained with such an interface is relatively low, and the use of magnetic actuators leads to a high power consumption.

Lastly, non-newtonian fluids have already been used to generate simple haptic effects such as button effects and relief effects. The article by Lochtefeld "Towards real organic user interfaces—using non-Newtonian fluids for self-actuated displays" (CHI13 workshop, 2013) describes a haptic device using a shear-thickening non-newtonian fluid sandwiched between two flexible sheets placed on a fixed array of loudspeakers. A topology perceptible with the finger is generated when a sound wave propagates through the fluid and hardens it locally.

The article by Poncet et al. "Static and dynamic studies of electro-active polymer actuators and integration in a demonstrator" (Actuators Journal, 2017) describes a device comprising piezoelectric electro-active polymer actuators arranged so as to obtain flexible-membrane-based vibrotactile buttons. These buttons are borne by a stiff carrier.

DISCLOSURE OF THE INVENTION

There is a need to further improve flexible haptic interfaces, especially in order to provide a touch interface capable of generating various haptic effects and having a good spatial resolution.

SUMMARY OF THE INVENTION

The invention aims to meet this need, and does so, according to a first of its aspects, by virtue of a flexible haptic interface comprising a haptic structure defining a touch surface touchable by a user, the structure comprising:
  a plurality of stiff touch pixels borne by a flexible carrier,
  at least one actuator that makes contact with each pixel and that is arranged to transmit, to the pixel, a mechanical excitation that leads to an effect perceptible tactilely by the user.

By virtue of the invention, the haptic structure has a certain flexibility, while still allowing satisfactory haptic effects to be generated, with a spatial resolution and a reliability suitable for many applications.

The interface may comprise any control circuit configured to modulate the signals sent to the actuators in order to mechanically induce a vibration of the pixels and to generate a corresponding haptic sensation on the touch surface.

Touch Pixels

The invention is not limited to touch pixels having a particular shape. However, certain shapes may facilitate manufacture. Thus, at least certain of the pixels, and better still all of the pixels, may have a polyhedral, and preferably parallelepipedal, general shape. The pixels may especially take the form of rectangular pads.

At least certain of the pixels, and better still all of the pixels, are preferably made of a relatively hard and commonplace material, such as glass, and preferably borosilicate glass.

At least certain of the pixels, and better still all of the pixels, preferably have a substantially constant thickness, preferably comprised between 50 microns and 5 mm, and better still between 200 and 700 microns.

All of the pixels may be identical. As a variant, it is possible to combine, within the same interface, touch pixels of different sizes, depending for example on their location relative to the touch surface, or on the application.

Carrier and Integration of the Touch Pixels

By "carrier", what is meant is any mono- or multi-layer structure that ensures the touch pixels are held in position within the haptic structure, and the cohesion of the touch pixels within the haptic structure.

The carrier is preferably formed from one or more polymeric materials, this possibly facilitating manufacture and the obtainment of the flexibility sought for the haptic structure.

The pixels are advantageously made of a material that is stiffer than that or those of the carrier. The ratio of the Young's modulus of each touch pixel to that of the carrier is for example higher than or equal to 8, and better still higher than or equal to 20, and even better still higher than or equal to 50, and more preferably comprised between 80 and 90, and especially equal to about 85.

The choice of the thickness of the carrier may be made depending on the flexibility thereof: the softer the carrier, the larger its thickness may be while allowing the sought flexibility to be preserved.

The touch pixels may be integrated into the carrier in various ways, depending on the structure of the carrier.

The carrier may especially comprise a bearing layer and a layer for compensating for the thickness of the pixels. This compensating layer lies between the pixels, above the bearing layer.

The bearing layer may also play a role as a protective layer protecting the touch pixels and/or the actuators with which the latter are equipped.

Preferably, the bearing layer has a substantially constant thickness, preferably comprised between 50 nm and 500 microns, and better still between 25 and 80 microns, and for example of 50 µm.

The bearing layer may alone ensure the touch pixels are held in place within the haptic structure. The thickness-compensating layer may also play this role, in association with the bearing layer.

The touch pixels may all be located on the same side of the bearing layer, and the compensating layer comprises flexible segments, also called "flexible bridges" or "flexible hinges", extending between the pixels.

The compensating layer is preferably of substantially constant thickness, preferably comprised between 100 microns and 5 cm, and preferably between 500 µm and 5 mm, and for example of 1 mm.

At least some of the touch pixels, and preferably all of the touch pixels, may have an exterior surface that emerges onto the touch surface.

This exterior surface of the touch pixels may lie flush with the exterior surface of the compensating layer, the exterior surface of the pixels and that of the compensating layer then defining a substantially smooth surface that may serve as touch surface for the interface.

The user then makes direct contact with the touch pixels when he places his finger in contact with the touch surface.

As a variant, the touch pixels and the compensating layer may be covered with a protective layer, which may be identical to the bearing layer of the carrier, or not. The thickness of this protective layer is relatively small, so as not to affect the perception of the touch effect unduly.

The carrier may comprise housings in which the touch pixels at least partially lie, the latter for example being continuously covered with a flexible sheet defining the touch surface.

In one example of embodiment, the carrier comprises a layer for receiving the touch pixels, the receiving layer for example forming basin-shaped housings, and the carrier also comprising a layer for covering the pixels, which layer is for example defined by the aforementioned flexible sheet.

The covering layer especially allows the exterior uniformity of the touch surface to be increased, and parasitic touch sensations that could otherwise be felt if the user made direct contact with the pixels and/or neighboring regions, since these might form to the touch a nonuniform surface, to be avoided.

Arrangement of the Touch Pixels

The touch pixels may be distributed in various ways over the carrier, especially depending on the application.

The spacing between two adjacent touch pixels is preferably comprised between 10 microns and 5 mm, and better still between 1 and 2 mm. A small spacing between the pixels especially allows the spatial resolution of the generated haptic effect to be increased, if it is desired to do so.

At least some of the pixels are for example arranged in rows and/or columns, and especially in the same plane when the carrier is flat, and preferably in a regular grid.

As a variant, the pixels may be placed with a concentric distribution, inter alia.

Actuators

Each touch pixel may be equipped with a plurality of actuators extending over one face of the pixel, for example the face located on the side of the carrier and/or its opposite face.

The one or more actuators associated with a touch pixel may each have a shape that is elongate, preferably in the direction of the width of the pixel in the case where the latter has a rectangular shape.

The actuators may be placed on either side of a median plane of the touch pixel, preferably at vibration nodes or anti-nodes.

The actuators may each have a polygonal general shape, and especially a rectangular or square shape, or have a circular shape.

Each actuator may be piezoelectric, ferroelectric, electromagnetic or thermal. In particular, each actuator may be a piezoelectric ceramic.

Associated Systems

The interface may comprise a system for detecting a contact of the user on the touch surface, and especially a capacitive detecting structure, which is where appropriate integrated into the haptic structure.

The interface may comprise a system allowing an image to be at least partially superposed on the touch surface. The interface may thus comprise a screen, and preferably a screen incorporating the haptic structure.

The interface may comprise at least one actuator allowing the interface to be selectively shaped into at least two distinct shapes. This may for example be useful to change the shape of the interface depending on the touch sensation to be reproduced, in order for example to improve the quality of the simulation.

Another subject of the invention is an article of clothing equipped with a haptic interface according to the invention and such as defined above.

Another subject of the invention is a mobile device equipped with an interface according to the invention and such as defined above.

Tactile Stimulus

Yet another subject of the invention is a method for generating at least one tactile stimulus capable of being felt by a user touching an interface according to the invention, comprising the steps consisting in:

detecting the position of the contact of the user on the flexible touch surface of the interface by virtue of a detecting system, modulating, by virtue of a control circuit, the signals sent to the actuators depending on the detected position in order to mechanically induce a vibration of the pixels and to generate an effect perceptible tactilely by the user on the touch surface.

The vibration of the pixels may generate a variation in friction perceptible tactilely by a user moving his finger over the touch surface. This effect, which is also called the squeeze-film effect, may give the user the impression of touching a surface comprising reliefs, or having various textures.

The vibration of the pixels may even generate a pulse perceptible tactilely by a user exerting a static contact on the touch surface. This effect for example allows the user to be given the impression of pressing on a button.

Production of an Touch Pixel

Another subject of the invention is a process for manufacturing an touch pixel equipped with piezoelectric actuators and usable in an interface such as defined above, comprising the steps consisting in:

depositing, preferably by screen-printing, at least a first layer of a conductive material on the upper face of a stiff carrier, preferably a carrier made of glass, fastening piezoelectric actuators to the first layer thus formed so as to establish a first electrical connection with the actuators, depositing a layer of an insulator on the layers deposited beforehand, thinning the insulating layer in order to uncover the upper face of each piezoelectric actuator, depositing a layer of a conductive material on the actuators thus uncovered, so as to establish a second electrical connection with the actuators, dicing the carrier so as to obtain touch pixels each equipped with one or more piezoelectric actuators.

This process especially allows a plurality of touch pixels to be manufactured, simply, using the same carrier, a glass plate for example.

The touch pixels thus obtained may then be transferred to a flexible carrier to form a haptic interface.

Yet another subject of the invention is a process for manufacturing a haptic interface such as defined above, comprising the steps consisting in:

depositing a first layer made of flexible material, and preferably made of polymer, on a manufacturing carrier, fastening touch pixels equipped with one or more actuators to the layer thus deposited, the actuators being placed on the exterior face of the pixels, electrically connecting each actuator to the control circuit, preferably by masking and sputtering of a conductive material, covering the touch pixels and actuators with a flexible material, preferably a polymer film, and, separating, especially by peeling, the assembly thus produced from the manufacturing carrier so as to uncover the lower face of the first layer.

This first layer may form the aforementioned covering layer, and the flexible material deposited on the pixels may form the aforementioned receiving layer.

BRIEF DESCRIPTION OF THE DRAWINGS

The invention will possibly be better understood on reading the following detailed description of non-limiting examples of implementation thereof, and on examining the appended drawing, in which.

DETAILED DESCRIPTION

Figure 1:
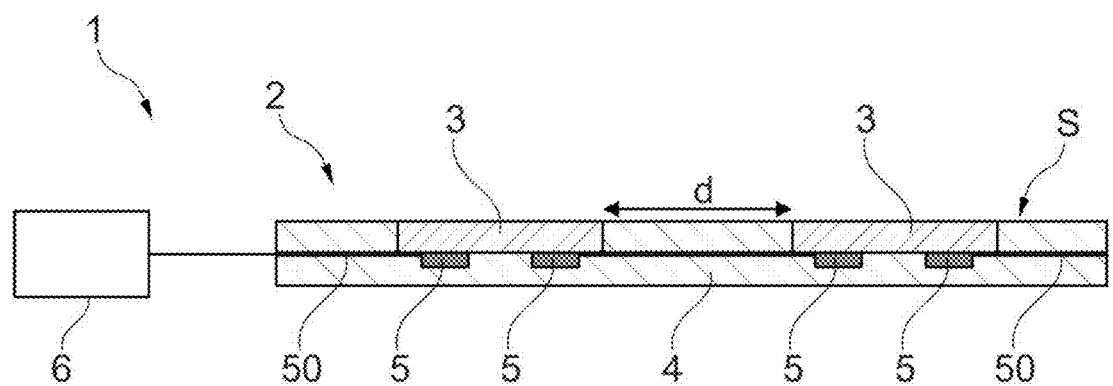
FIG. 1 partially and schematically shows an example of a flexible haptic interface according to the invention, FIG. 2 partially and schematically shows an example of a haptic structure comprising touch pixels arranged in a matrix array, FIG. 3 partially and schematically illustrates an example of integration of the touch pixels into the interface.

FIG. 1 illustrates one example of a flexible haptic interface 1 according to the invention. The interface 1 comprises a haptic structure 2 defining a touch surface S. The haptic structure 2 comprises touch pixels 3 that are borne by a flexible carrier 4. The touch pixels 3, which are called pixels by analogy with the optically active pixels of a screen, are stiff and placed on the carrier 4 so that the haptic structure 2 preserves an overall flexibility in at least one direction, and better still in every direction.

The touch pixels 3 are equipped with one or more actuators 5, preferably piezoelectric actuators, the latter being connected to a control circuit 6 by virtue of electrical connections 50. The control circuit 6 is configured to modulate the signals sent to the actuators 5 in order to mechanically induce vibration thereof and to generate a haptic sensation on the touch surface S.

The haptic structure 2 may be of any shape, and of various sizes. Its dimensions are for example, depending on the application, of the order of one cm, of one dm or of one meter.

The touch pixels 3 may be various shapes, and for example rectangular, square, circular, inter alia. Their largest dimension is for example comprised between a few hundred microns and a few cm in side length, and preferably from 2 mm to 1 cm in side length.

The touch pixels 3 are for example made of glass, and especially borosilicate glass, or of silicon.

The touch pixels 3 may be distributed over the carrier 4 in various configurations.

Figure 2:
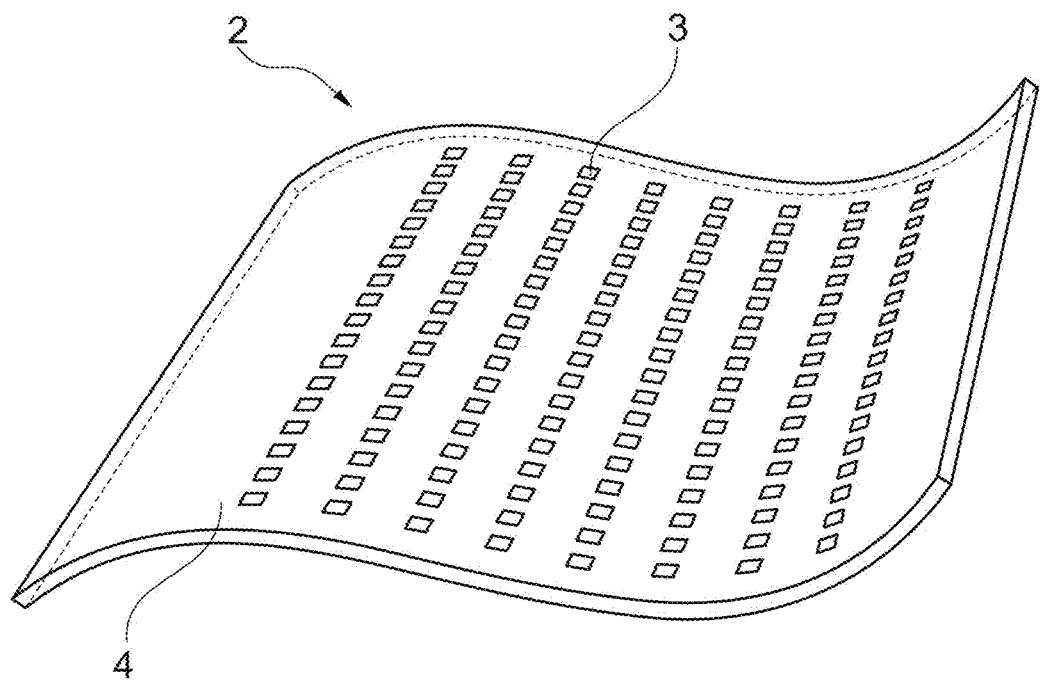

For example, in FIG. 2 identical touch pixels 3 distributed in rows and columns over the carrier 4, in a regular array, have been illustrated.

In other embodiments (not illustrated), the interface 1 comprises touch pixels of different shapes and/or sizes, or even touch pixels 3 placed with a concentric distribution or staggered.

The size of the touch pixels may in particular be adjusted in order to generate haptic effects that simulate tactilely larger or smaller patterns.

It is also possible to adjust the spacing between the touch pixels in order to generate haptic effects of higher or lower spatial resolution. The distance d between two touch pixels is preferably comprised between a few tens of microns and a few mm, and in particular between 1 and 2 mm.

The carrier 4 holds the touch pixels 3 and participates in the cohesion of the haptic structure 2.

The carrier 4 may be mono-layer or multi-layer. It is preferably made of polymer, and for example of polyethylene naphthalate (PEN), polyimide (PI) or even polycarbonate (PC). It may furthermore comprise one or more thin layers of metal oxides, of silicon or of other metals. The thickness of the carrier is set depending on the nature of the material, so as to preserve the desired flexibility.

A touch pixel 3 may be integrated into the structure 2 in a number of ways.

Figure 3:
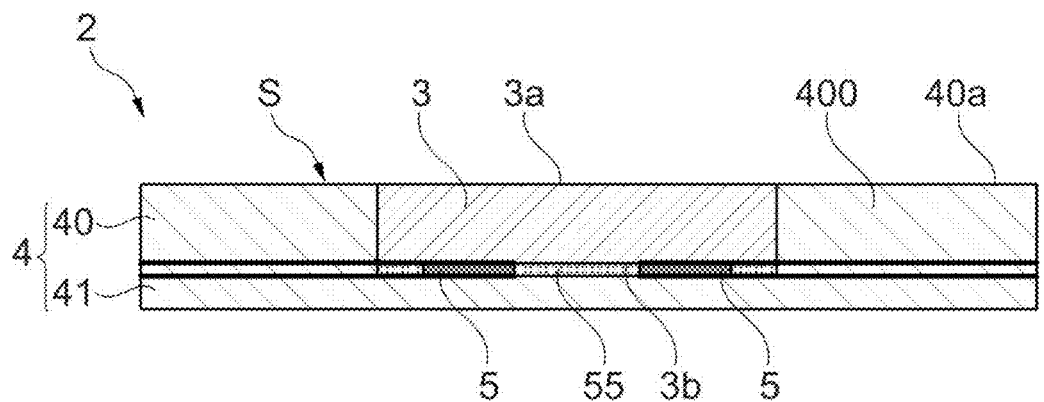

In the example illustrated in FIG. 3, the carrier comprises a bearing film 41, which may serve as protective layer, and a layer 40 for compensating for the thickness of the pixels 3.

The pixels 3 are borne by the film 41 and the entire thickness thereof is embedded in the compensating layer 40, which defines flexible segments 400 between the pixels, which segments are also called "hinges".

The touch pixels 3 have an exterior surface 3a that emerges onto the touch surface S. As illustrated, the compensating layer 40 may have an exterior surface 40a that lies flush with the surface 3a of the touch pixels, so as to form therewith a smooth surface, which is substantially planar when the haptic structure 2 is flat. The compensating layer 40 may have substantially the same thickness as the touch pixels 3.

The user may touch the surface 3a of the touch pixels 3 of the interface directly when he brings his finger into contact with the touch surface S.

As a variant, it is possible to cover the touch pixels 3 and the compensating layer 40 with a thin protective layer (not shown). This allows the uniformity of the touch surface to be increased, and prevents the user from feeling an undesired texture effect due to the difference between the material of the pixels and that of the compensating layer 40.

In the example illustrated in FIG. 3, the actuators 5 are preferably located on the face 3b of the touch pixels 3 that is located on the side of the bearing film 41, as illustrated. The touch pixels 3 equipped with the actuators 5 are for example fastened to the carrier 4 by virtue of an insulating adhesive 55.

Figure 4:
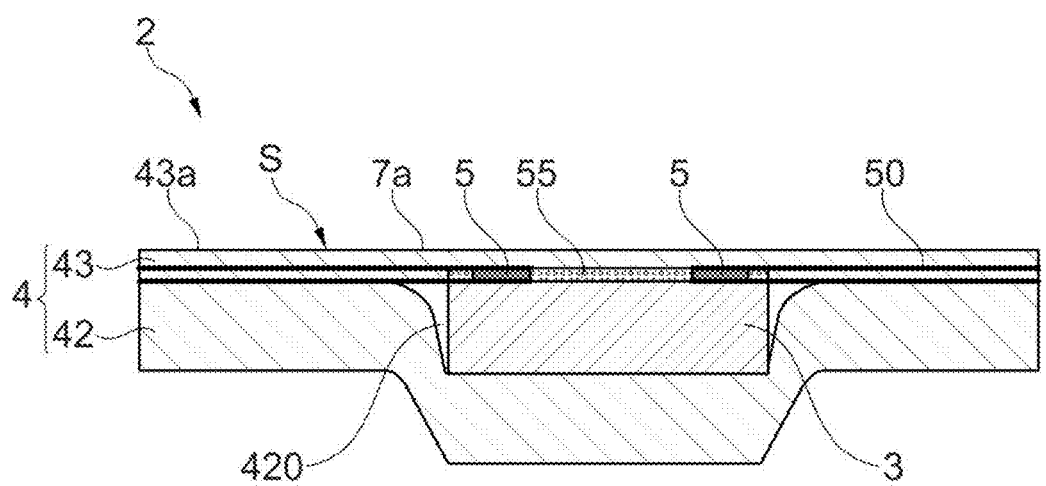
FIG. 4 is a view analogous to the one shown in FIG. 3 of another example of integration of the touch pixels, FIG. 5 partially and schematically shows an example of a flexible haptic interface equipped with an associated system.

In the variant illustrated in FIG. 4, the carrier 4 comprises a layer 42 for receiving the pixels 3 and a covering layer 43.

The receiving layer 42 forms basin-shaped housings 420, which each accommodate one touch pixel 3. The covering layer 43, which is for example a flexible polymer sheet, continuously covers the receiving layer 42 and the touch pixels 3, thus closing the housings 420 from above.

The covering layer 43 for example also serves as a protective sheet protecting the touch pixels 3.

In the example in question, the free face 43a of the covering layer 43 defines the touch surface S. The covering layer 43 is thin enough for the vibrational effect of the touch pixels 3 to be able to propagate to the touch surface S. The covering layer 43 for example has a thickness comprised between a few microns and a few tens of microns.

In this variant, the actuators 5 may immaterially be located on the lower face of the pixel 3, i.e. between the touch pixel 3 and the bottom of the housing 420 of the receiving layer 42, and/or the upper face of the touch pixel 3, i.e. between the touch pixel 3 and the covering layer 43. When some actuators 5 are present on the opposite faces of an pixel 3, their excitation is preferably controlled so as to take advantage of constructive vibrational interference therebetween.

Figure 5:
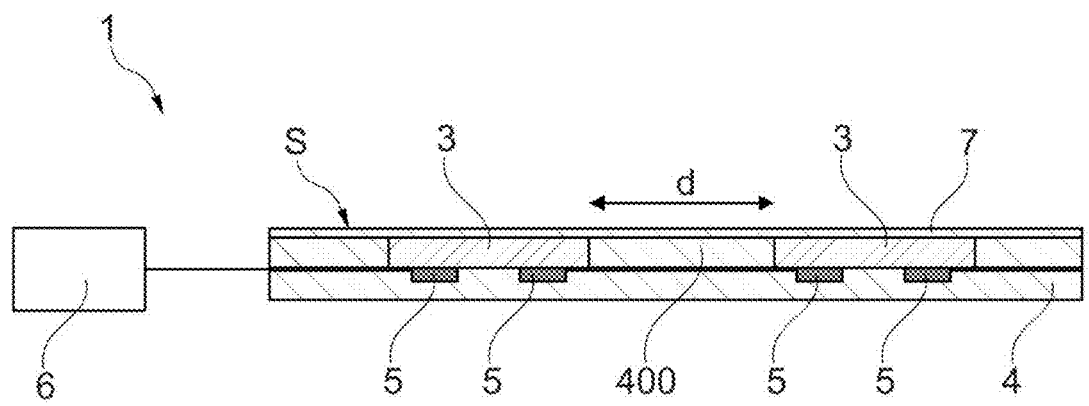

In the example illustrated in FIG. 5, the interface comprises a detecting system 7, for example a known prior-art capacitive system, allowing at least one point of contact of the finger of the user with the surface S to be detected.

The detecting system has been shown in FIG. 5 schematically in the form of a member covering the touch pixels 3 and the carrier 4, but it may form part of the carrier 4 or be integrated into the touch pixels.

The interface 1 may furthermore comprise one or more associated devices allowing user experience to be improved, and especially it to be made a multisensory experience.

The interface 1 may thus comprise a flexible screen (not shown) that allows an image to be superposed on the touch surface S and for example the user to be given the impression of touching, virtually, what he is able to see on the screen. The interface 1 may further comprise one or more loudspeakers (not shown) with a view to adding an audio effect.

The actuators 5 may be of various shapes and sizes. The number, arrangement and size of the actuators 5 on a touch pixel 3 depends on the sought-after effect.

Figure 6:
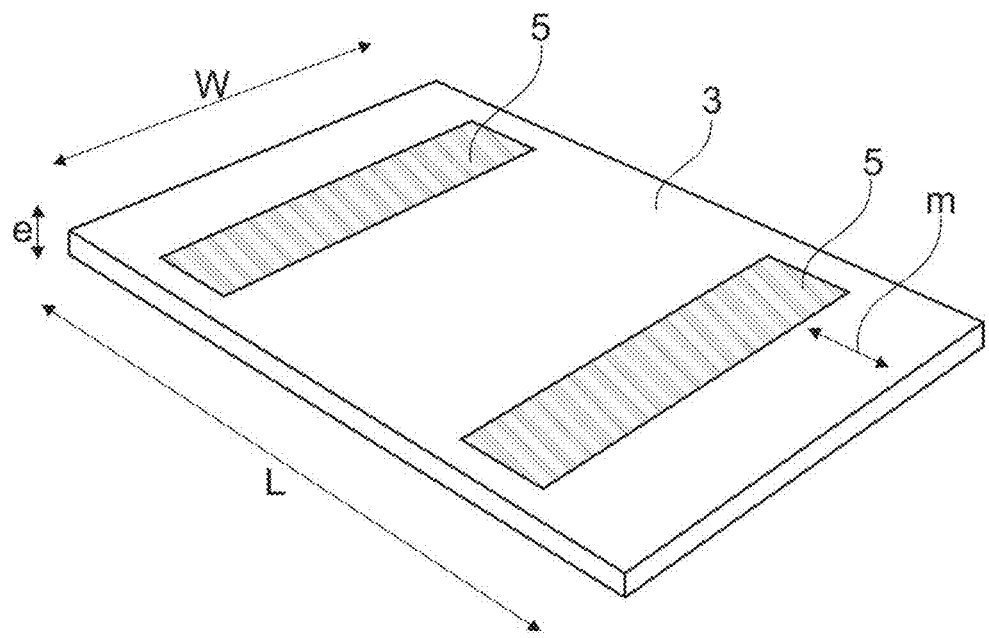
FIG. 6 is a partial and schematic perspective view of an example of a touch pixel equipped with two actuators.

FIG. 6 illustrates an example of a touch pixel 3 taking the form of a rectangular pad of width W of about 1 cm and of length L of about 1.5 cm. The thickness e of the pixel 3 in the example in question is 500 microns.

The pixel 3 bears two strip-shaped actuators 5, each of a width of about 2000 microns for example, and which are each for example placed at a distance m of 2250 microns from a lateral edge of the pixel.

The actuators 5 are for example 2 microns in thickness, and for example have an active layer based on aluminum nitride (AlN), lead zirconate titanate (PZT) or any other suitable ferroelectric or piezoelectric material.

The size and position of the two actuators 5 are for example chosen such as to generate a Lamb oscillatory mode in the touch pixel, for example at a frequency of about 61 kHz, according to the methodology described in the article by Casset, F., et al. "Low voltage actuated plate for haptic applications with PZT thin-film" (Proceedings of Transducers, 2013).

Figure 7:
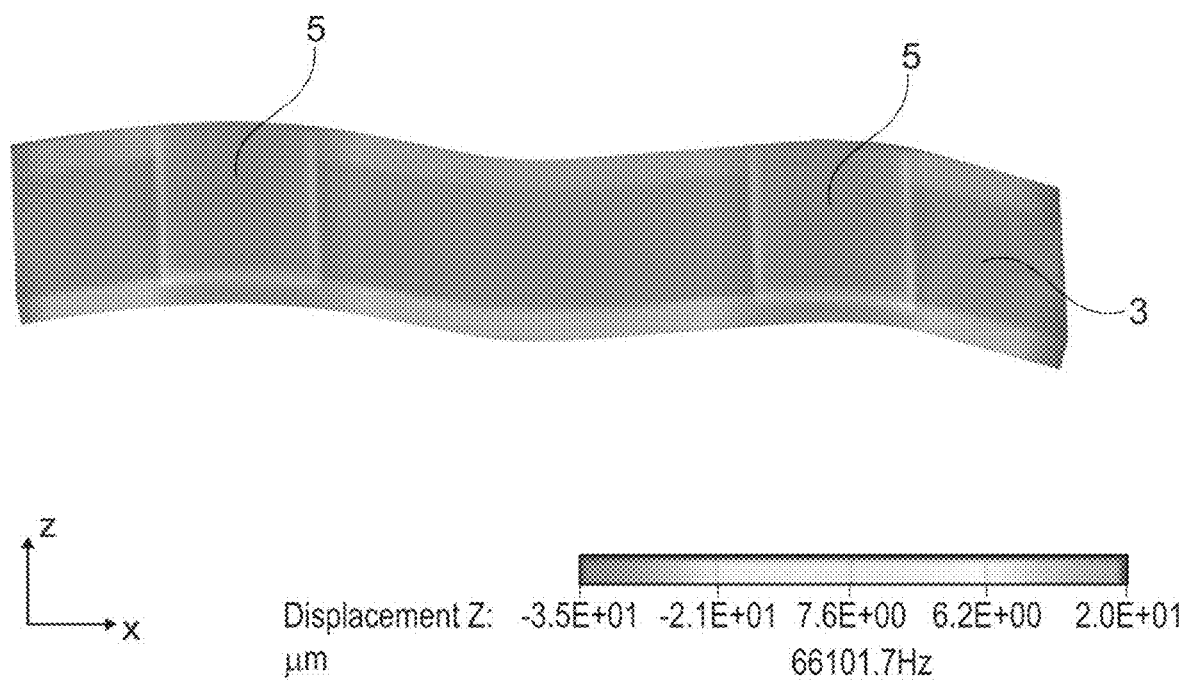
FIG. 7 illustrates a Lamb mode generated on the touch pixel of FIG. 6 by the actuators making contact therewith.

As illustrated in FIG. 7, the actuators 5 may be located at the anti-nodes of the vibrational mode that they generate. However, other actuation configurations, for example comprising actuators positioned at vibration nodes, are possible. The embodiment of FIG. 7 for example allows a variation in friction on the touch pixel 3 that is tactilely perceptible by a user moving his finger over the touch surface to be generated.

It is possible to obtain a haptic effect similar to the one that has just been described with a touch pixel of different thickness.

In particular, a plurality of vibrational modes may be generated at frequencies that depend on the thickness of the touch pixel 3. It is possible to generate, in the touch pixel 3, a Lamb mode, as described above, or the first vibrational mode in the dimension of the length L of the pixel, or even the first vibrational mode in the dimension of the width W of the pixel.

The various vibrational modes will possibly be obtained by adapting the piezoelectric actuators using the method described in the article by Poncet et al, "Design and realization of electroactive polymer actuators for transparent and flexible haptic feedback interfaces" (EuroSime, 2016).

Figure 8:
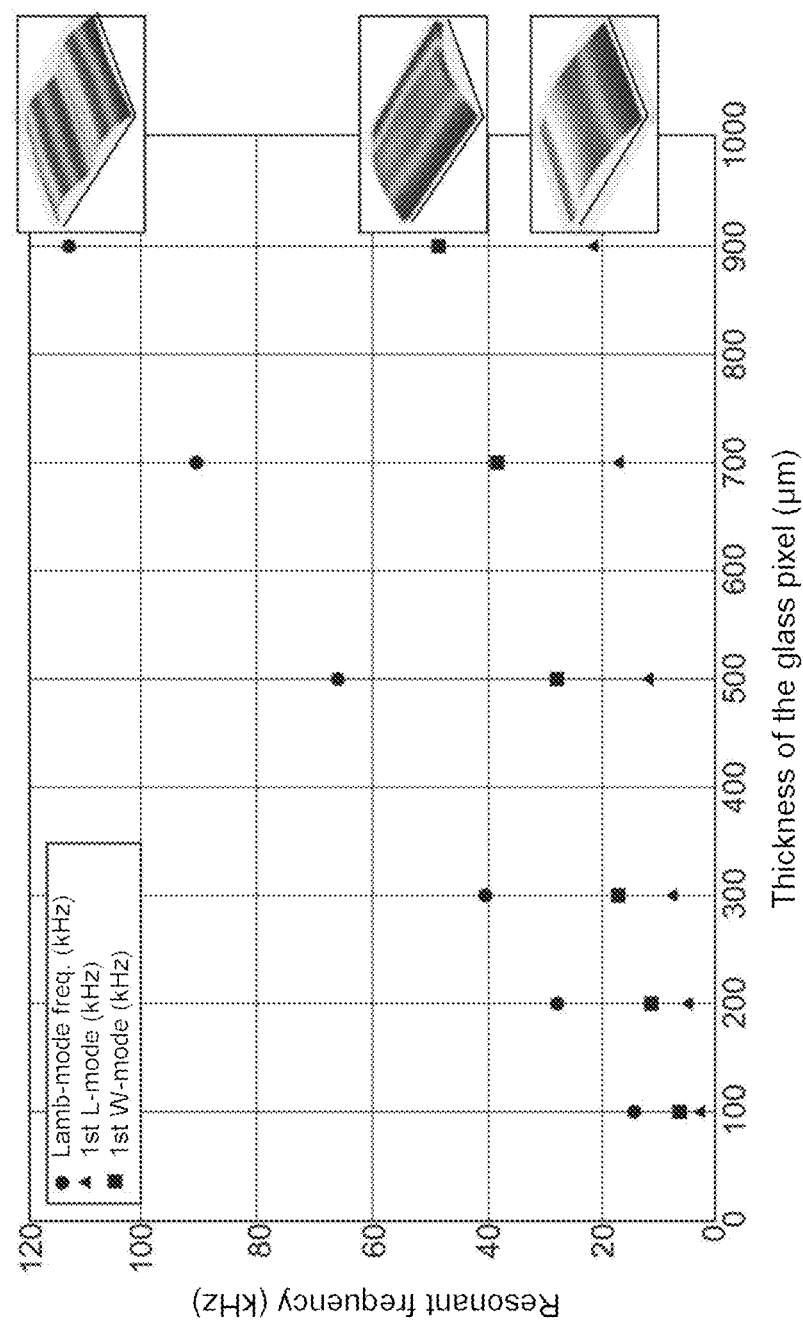
FIG. 8 is a graph illustrating the resonant frequencies of the pixel of FIG. 6 as a function of its thickness.

The graph of FIG. 8 shows examples of resonant frequencies corresponding to the three aforementioned vibrational modes, as a function of the thickness of the pixel for a touch pixel of planar dimensions of 1×1.5 cm² comprising two strip-shaped actuators such as shown in FIG. 6.

It may be seen from this figure that if it is desired to use the Lamb mode (indicated by circles in the graph) to generate the sought-after haptic effect, a thickness of the touch pixel comprised between 200 and 700 microns will advantageously be chosen, in order to remain at frequencies inaudible to the human ear, i.e. higher than about 20 kHz, and at frequencies lower than 100 kHz, so as to keep the control electronics relatively simple.

Likewise, if it is desired to exploit the first vibrational mode in the dimension of the length L of the pixel (indicated by triangles in the graph), a thickness of the touch pixel larger than 900 microns will be chosen.

Lastly, if it is desired to exploit the first vibrational mode in the dimension of the width W of the pixel (indicated by squares in the graph), a thickness of the touch pixel between 500 and 900 microns will be chosen.

The thickness of the pixel 3 is in addition constrained by the stiffness sought to perceive the touch effect. Specifically, a low stiffness of the touch pixel 3, induced, inter alia, by a small thickness, may decrease the force exerted by the touch pixel 3 on the user and therefore the effect felt. A larger thickness of the touch pixel 3 in contrast decreases the amplitude of vibration of the pixel, and may therefore attenuate the haptic effect felt.

A thickness comprised between 50 microns and a few mm, and preferably comprised between 200 and 700 microns, may be a good compromise.

In one variant, the actuators 5 are distributed over the touch pixel 3 in a matrix-array arrangement. In one example, actuators 5 of square shape of about 5×5 mm², spaced apart regularly by 2 mm, are distributed in this way over the pixel 3. In another example, the touch pixel 3 is equipped with a single actuator 6, which is for example placed at the center of one of its main faces.

The stiffness of the carrier 4 bearing the touch pixels 3, with respect to that of the touch pixels 3, also has an impact on the quality of the generated haptic effect.

Figure 9:
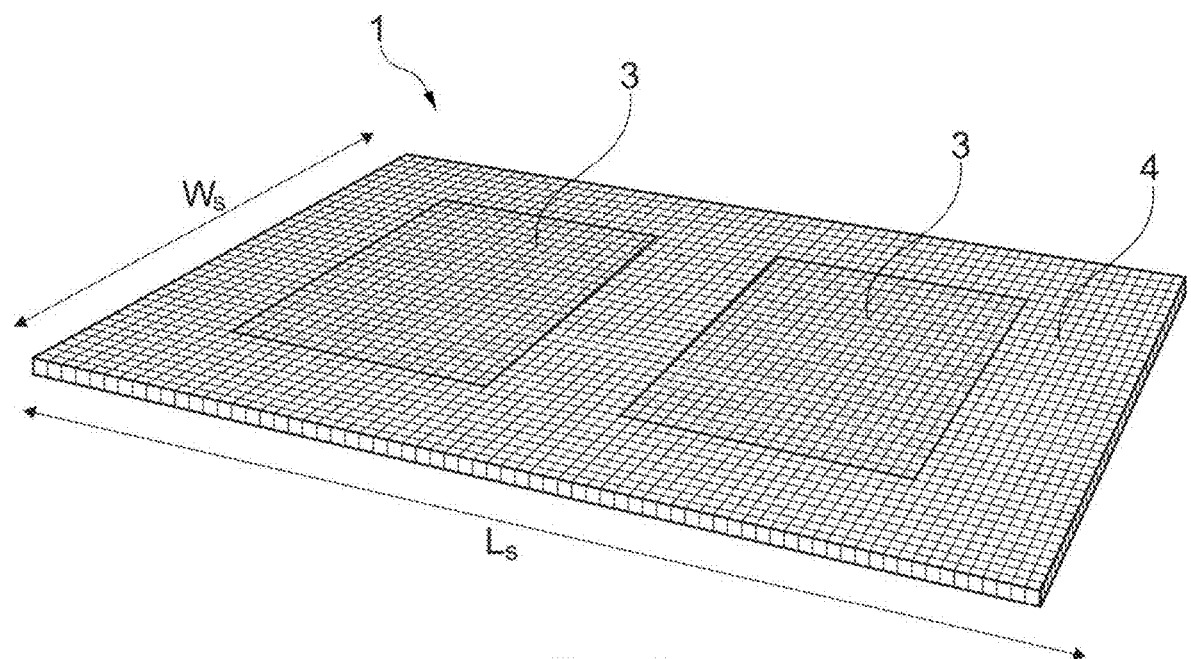
FIG. 9 is a partial and schematic perspective view of a haptic structure showing two touch pixels.

Results of simulation of the vibrations of a haptic structure 2, such as shown in FIG. 9, comprising a carrier 4 bearing two touch pixels 3 similar to that of FIG. 6 are described below. These results were obtained with the commercially available software package COVENTOR, but any other software package, especially allowing a finite-elements analysis, is usable.

Figure 10:
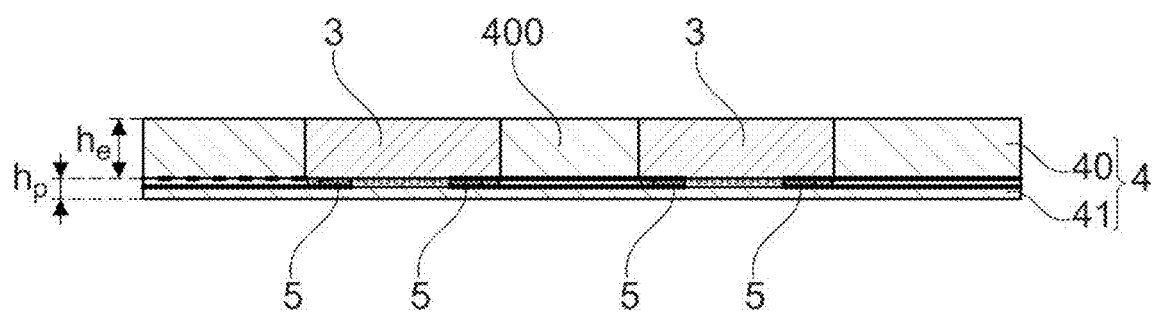
FIG. 10 is a schematic and partial cross section through the thickness of the haptic structure of FIG. 9.

In the example in question and as shown in FIG. 10, the touch pixels 3 were embedded in the carrier 4 and had an exterior surface 3a that emerged onto the touch surface S. The structure of the carrier 4 was such as described with reference to FIG. 3.

The touch pixels 3 were for example slips of borosilicate glass of about 500 microns in thickness. Their Young's modulus was of the order of 65 to 70 GPa.

The carrier had a length $L_S$ of 3.5 cm, a width $W_S$ of 2.5 cm and a total thickness $h_E + h_P$ equal to 525 microns, the thickness $h_E$ of the compensating layer 40 being 500 microns, and the thickness $h_P$ of the bearing film 41 being 25 microns.

Figure 11:
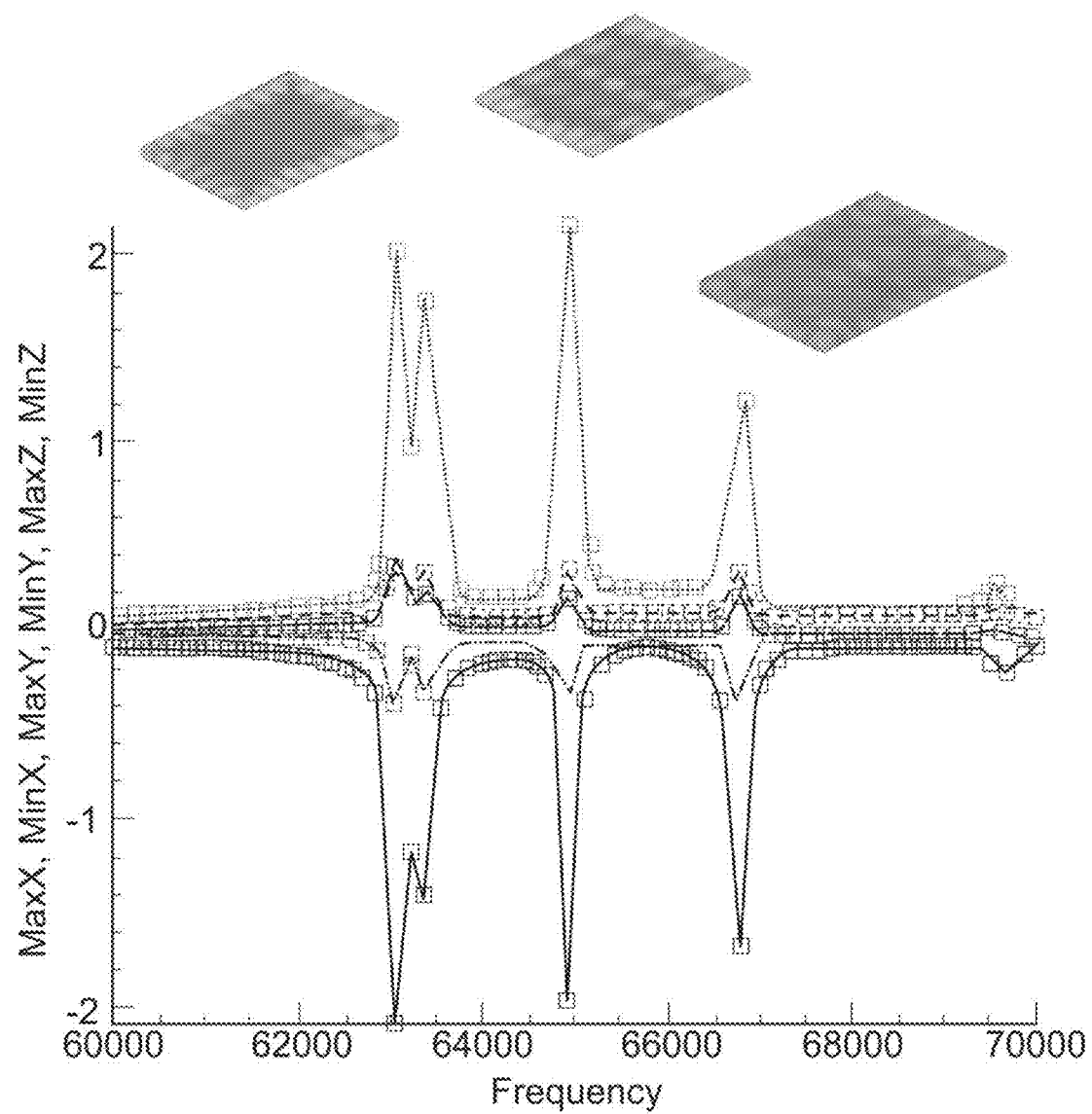
FIG. 11 is a graph illustrating vibration of the haptic structure of FIG. 9 when the carrier is made of polyimide (PI), FIG. 12a partially and schematically illustrates vibration of the haptic structure of FIG. 9 when the carrier is made of polyethylene naphthalate (PEN)

FIG. 11 illustrates the amplitude of vibration simulated for such a haptic structure in the X-, Y- and Z-directions, for a frequency comprised between 60 and 70 kHz, when the carrier 4 that served as comparative example was made of PI, which material had a Young's modulus of the order of 7.5 GPa. The sought-after vibrational mode was not obtained under these conditions, and no advantageous haptic effect was able to be generated. The carrier 4 made of PI being too rigid, it applied mechanical boundary conditions to the perimeter of the touch pixels and restricted their vibration.

Figure 12A:
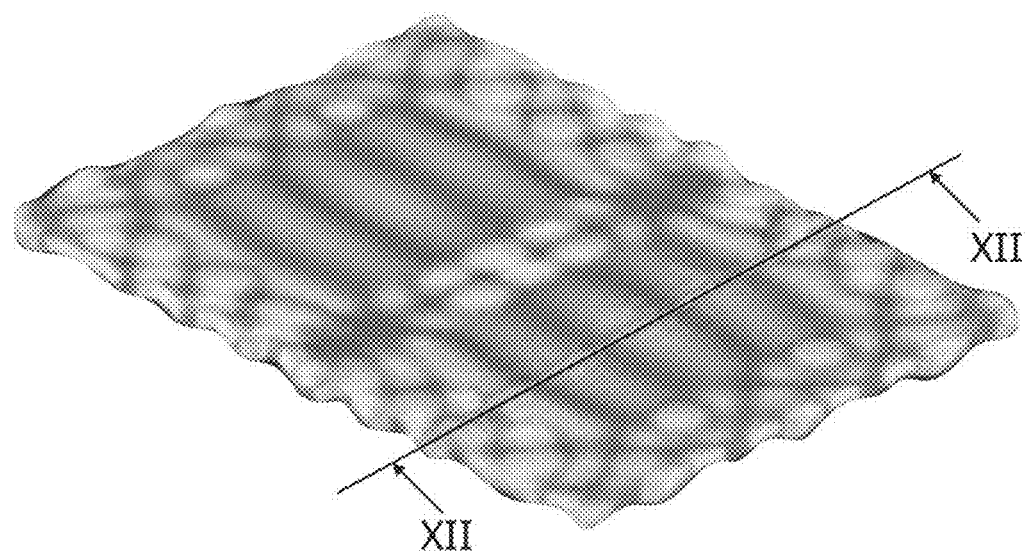
FIG. 12b is a graph showing the amplitude of vertical deformation of a touch pixel in cross section XII of FIG. 12a, FIG. 13a partially and schematically shows a haptic structure comprising a matrix array of touch pixels, FIG. 13b partially and schematically shows the possibility of making only some of the touch pixels of the haptic structure of FIG. 13a vibrate.
Figure 12A:
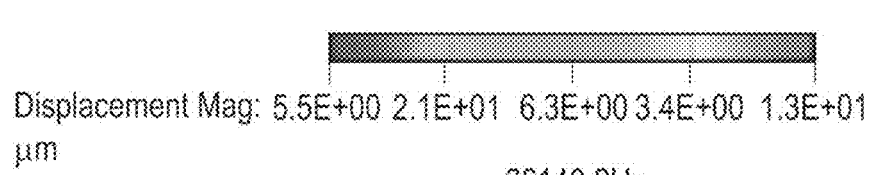

In contrast, when the carrier 4 was made of PEN, material the Young's modulus of which was of the order of 0.75 GPa, it was possible to generate a natural Lamb mode in the haptic structure 2, as shown in FIG. 12a.

Figure 12B:
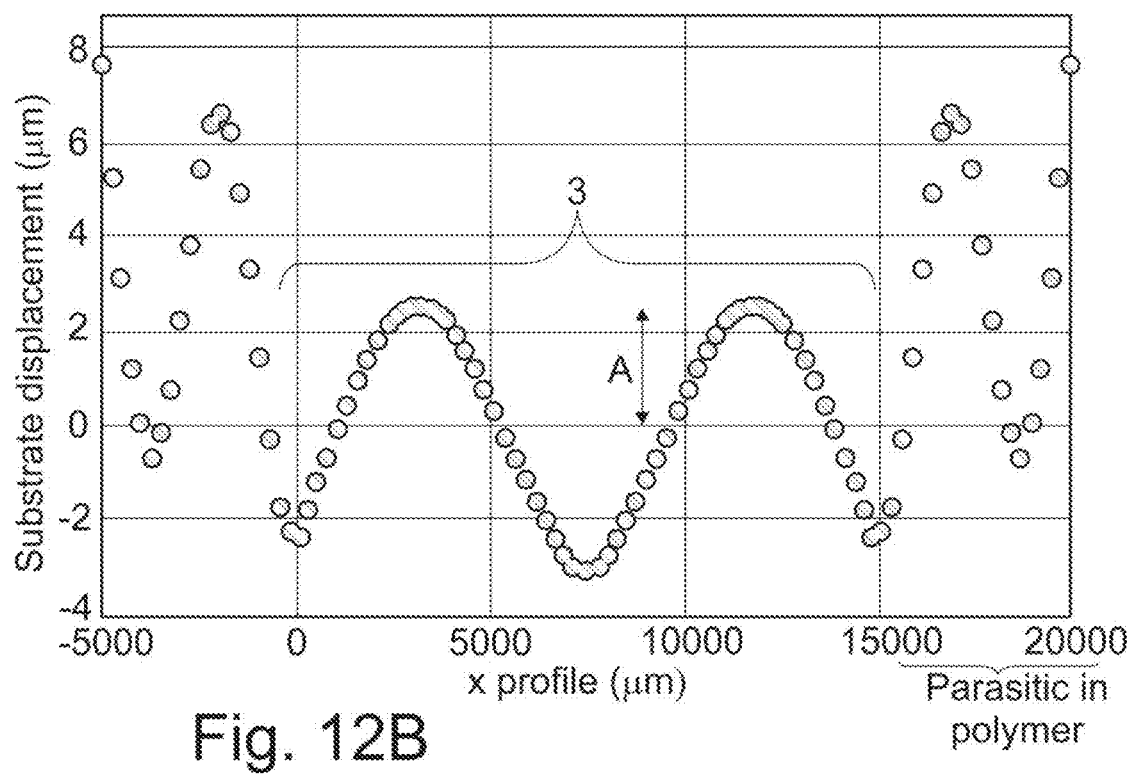

As illustrated in FIG. 12b, the corresponding amplitude A of deformation of the touch pixels 3 was able especially to reach +/−2 microns when the corresponding actuators 5 were subjected to an AC voltage of +/−30 V, this allowing a marked haptic effect to be obtained.

A ratio of the Young's moduli of about 65 GPa/7.5 GPa, i.e. of the order of 8, therefore did not allow the desired haptic effects to be produced under the simulated conditions. In contrast, a ratio of the order of 86 (corresponding to 65 GPa/0.75 GPa) allowed the desired effects to be produced.

Of course, other thicknesses $h_P$ and $h_E$ are envisionable. For example, for a polymer such as PEN, PI or PC, a thickness comprised between 100 microns and a few cm, and preferably a few mm, allows the carrier to provide mechanical strength while remaining flexible.

The thickness $h_P$ is preferably small enough, especially with respect to $h_E$, to not disrupt the electromechanical behavior of the touch pixels 3. It is for example comprised between a few tens of nm and a few hundred microns, and preferably between 25 and 90 microns.

The carrier 4 may be multi-layer or mono-layer, as described above. In the case of a multi-layer carrier, the Young's modulus $E_T$ and the total thickness $h_T$ of the carrier will possibly be obtained using the following approximations, which are known in the prior art:

$$h_T = \sum_i h_i$$

$$E_T = \sum_i \frac{E_i \cdot h_i}{h_T}$$

With $h_i$ and $E_i$ the thickness and the Young's modulus of layer i, respectively.

The one or more actuators of each touch pixel 3 of an interface 1 may be addressed independently by the control circuit 6, this allowing haptic effects that are relatively localized on the touch surface S to be generated.

Figure 13A:
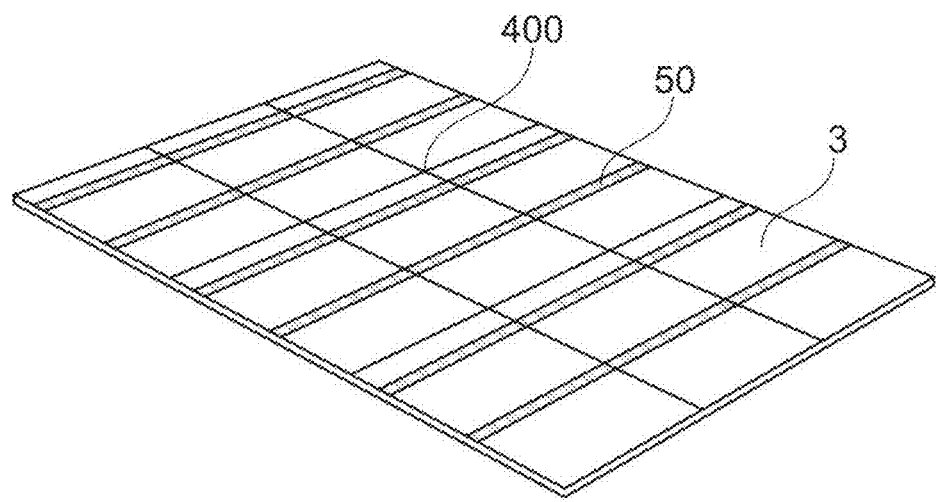
Figure 13B:
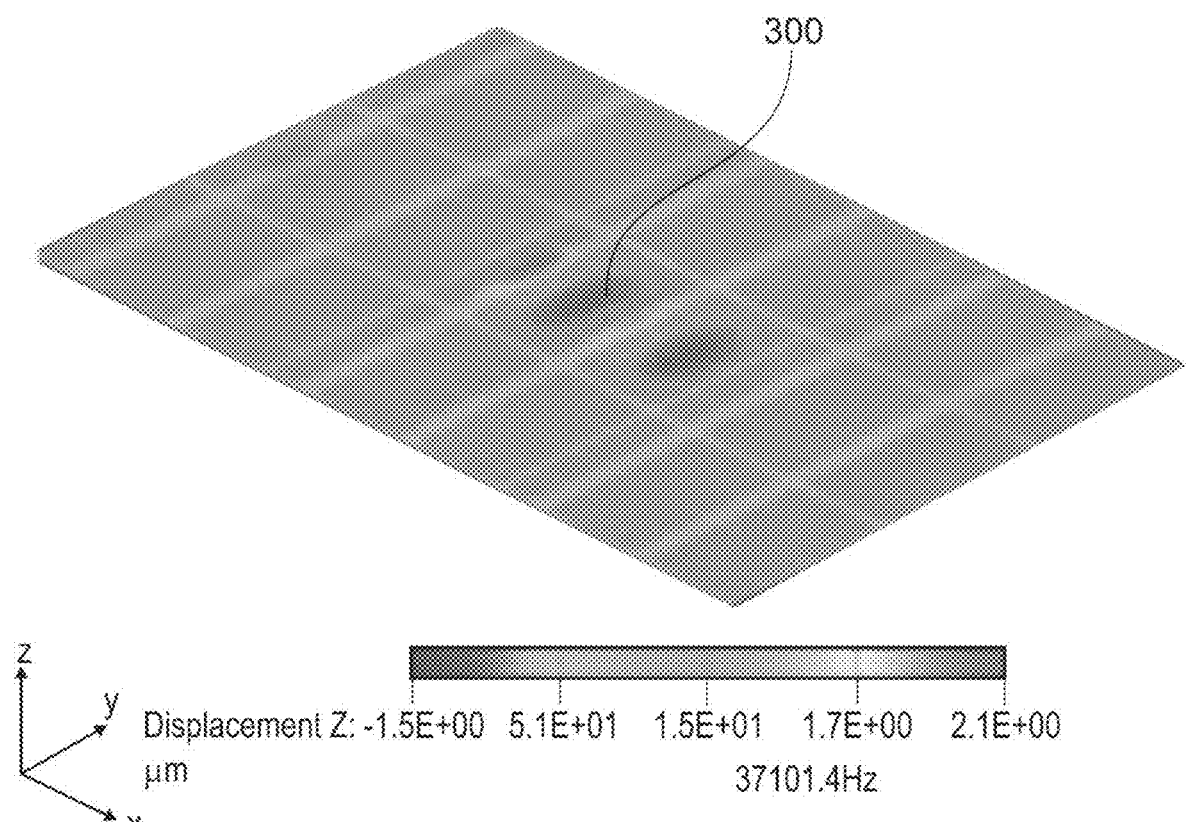

It is for example possible to obtain a perceptible deformation of the touch surface S solely at its center, as illustrated in FIG. 13b, by solely activating the central touch pixel 300 of a matrix array of 3×3 touch pixels, i.e. a matrix array such as shown in FIG. 13a.

Figure 14:
FIG. 14 is a block diagram illustrating one example of operation of the haptic interface according to the invention, FIG. 15a partially and schematically illustrates the possibility of generating a button touch effect using an interface according to the invention, FIG. 15b partially and schematically illustrates the possibility of generating a relief touch effect using an interface according to the invention, FIG. 15c partially and schematically illustrates the possibility of generating a texture touch effect using an interface according to the invention, FIG. 16, FIG. 17 and FIG. 18 partially and schematically illustrate successive steps of an example of a process for manufacturing touch pixels with their actuators, FIG. 19, FIG. 20, FIG. 21 and FIG. 22 partially and schematically illustrate successive steps of an example of a process for manufacturing a haptic structure.

A haptic interface 1 according to the invention may operate according to the steps illustrated in FIG. 14.

In step 81, the interface is on standby, in the absence of a user touching the touch surface S, and the touch pixels 3 are at rest.

In step 82, the detecting system 6 detects at least one point of contact of the user with the surface S and the control circuit 6 determines the location where the one or more haptic effects must be generated.

In step 83, the control circuit 6 sends suitable control signals to actuate at least some of the actuators 5 so as to generate the desired haptic effect.

In step 84, the actuators 5 in question contract or lengthen via an inverse piezoelectric effect, with an actuation amplitude corresponding to the received signal, generating, via a unimorphic effect, a vibration of the stiff pixel 3 with which they make contact.

In step 85, the vibration of the one or more touch pixels that is induced by the actuators is perceived tactilely by the user on the surface S.

In step 86, the user breaks contact with the touch surface S and the interface may return to standby, if it is desired to save energy for example.

The tactile perception generated in step 85 for example results from feeling a vibration of the touch pixels, this possibly giving the user the impression of touching a vibrating surface or a surface having a relief.

By actuating more or fewer touch pixels, it is possible to create relatively complex effects. Certain are described below and illustrated in FIGS. 15a, 15b and 15c.

A matrix array 10 of identical touch pixels 3, of circular shape and distributed uniformly over the matrix array 10, staggered, will be considered in the following examples. The touch pixels each comprise an actuator 5 placed at their center.

Figure 15A:
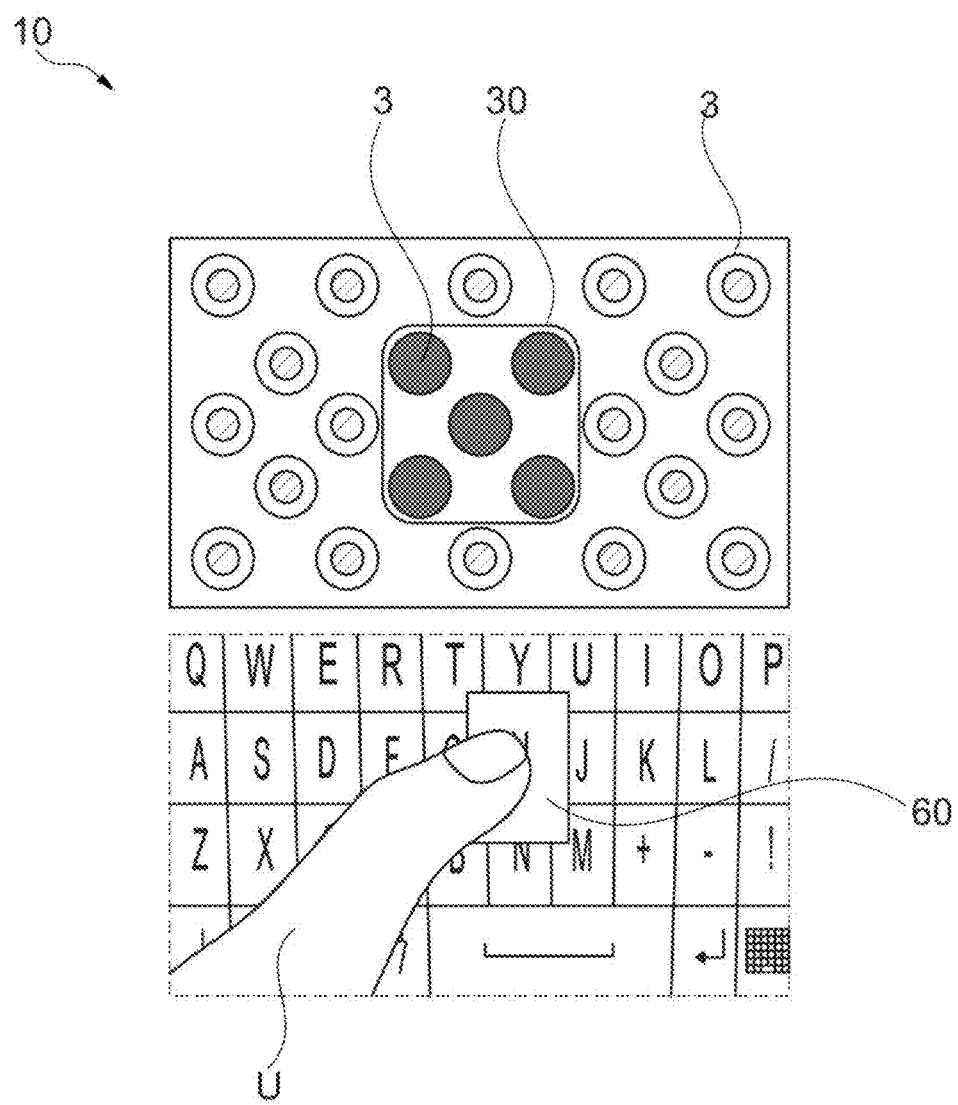

In the example illustrated in FIG. 15a, a group of touch pixels 30 belonging to the matrix array 10 is actuated by the control circuit 6 in order to transmit to a user U exerting a static contact on the surface a pulse corresponding to a tactile perception 60 of a "key-click effect", i.e. one giving the user the impression of having pressed on a keyboard key.

Figure 15B:
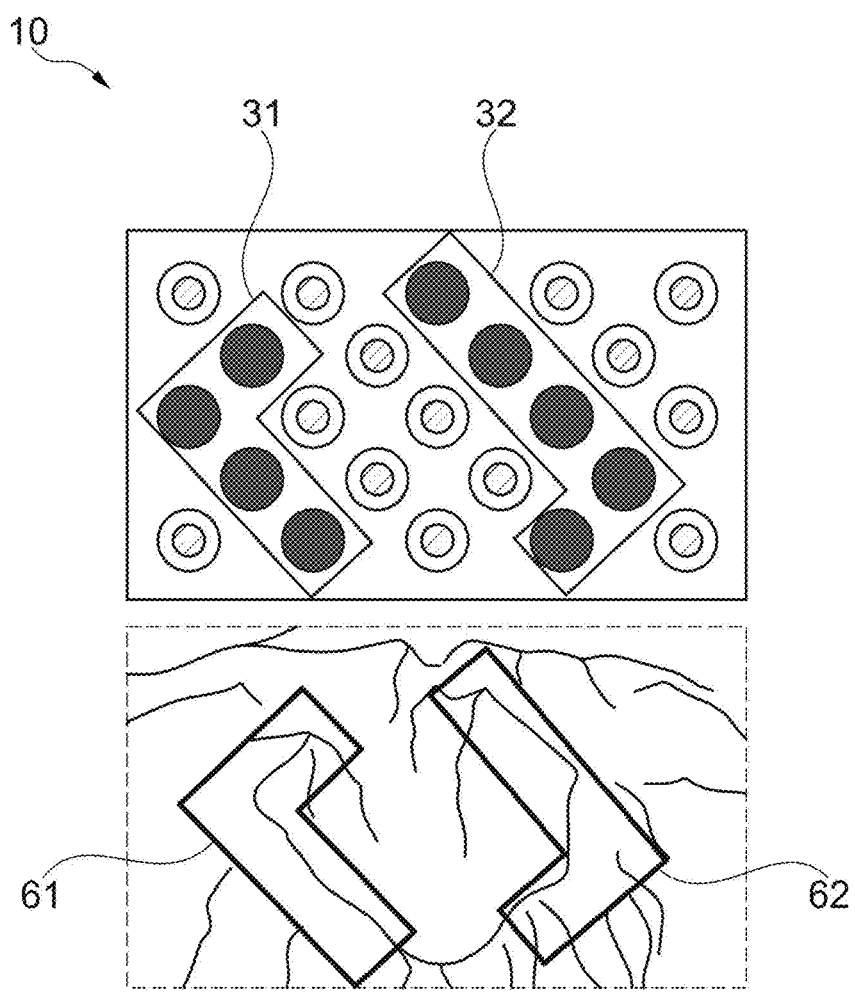

In another example, illustrated in FIG. 15b, a plurality of groups of actuators 31 and 32 are actuated simultaneously or alternately in order to generate tactile perceptions 61 and 62 of a pseudo-relief effect, i.e. one giving the user, who is moving his finger in contact with the interface, the impression of brushing against reliefs, for example the peak of a mountain of a map displayed on a screen.

Figure 15C:
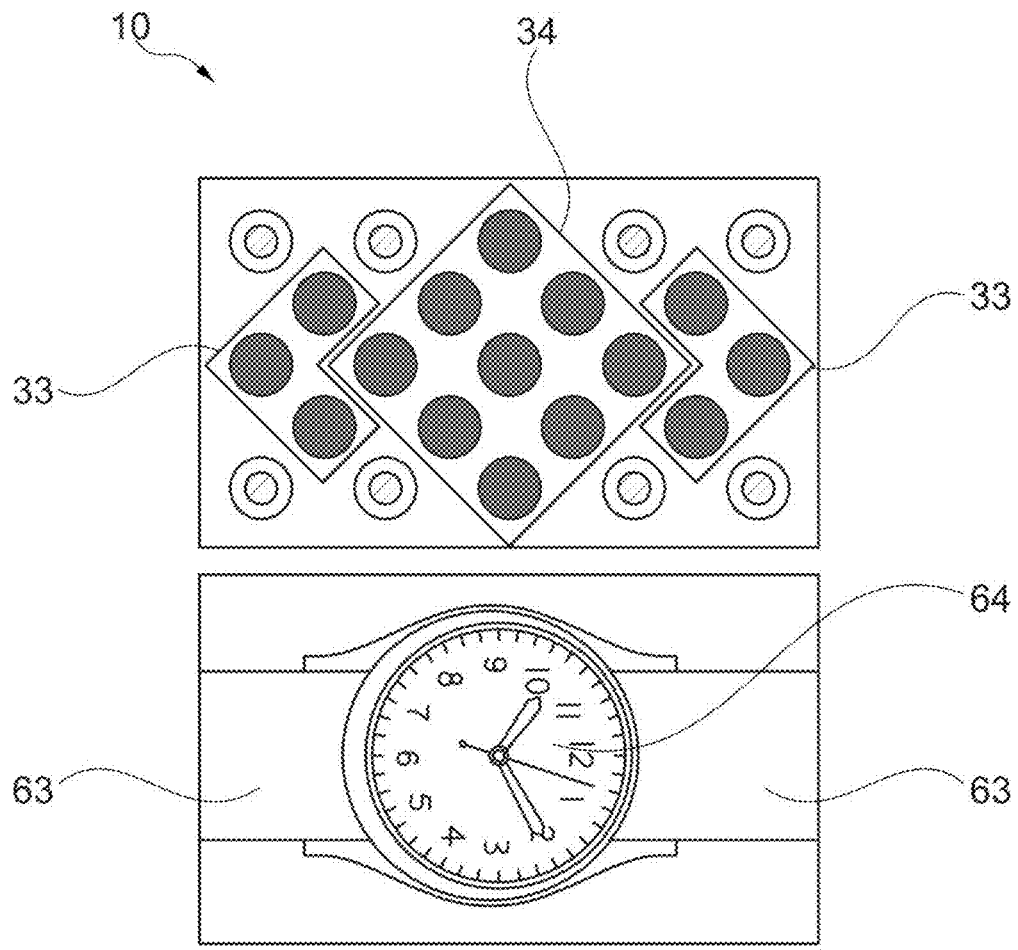

In another example, illustrated in FIG. 15c, groups of touch pixels 33 and 34 are activated simultaneously or alternately in order to generate tactile perceptions 63 and 64 of a texture effect, i.e. one giving the user, who is moving his finger in contact with the interface, the impression of touching the smooth surface 64 of the dial of a watch or the rougher surface 63 of its strap.

The user, by moving his finger, is able to perceive a variation in friction, which is also called the squeeze-film effect, due to the touch pixels 3, which for example generate an ultrasonic mode or an evanescent wave when they are excited by the actuators 5.

In the examples that have just been described, the touch pixels 3 of a given group may be activated in a vibrational mode that is identical for all the touch pixels of the group, or that is specific to each touch pixel, depending on the sought-after effect.

Touch pixels 3 equipped with piezoelectric actuators 5 may be produced by following the steps illustrated in FIGS. 16 to 18 and described below.

Firstly, for example by screen-printing, a first layer 24 of an electrically conductive material, of gold for example, is deposited on the upper face of a stiff plate 22, especially a plate made of glass.

The layer 24 is discontinuous: it for example comprises a plurality of separate sections 24a and 24b that form the electrical supply tracks of the actuators 5 that will make contact with the touch pixels 3.

The thickness of the plate 22 is for example 500 microns. The thickness of the layer 24 is for example 300 nm.

Next, piezoelectric actuators 5 comprising, for example, a lower electrode 52, a ferroelectric or piezoelectric layer 54 and an upper electrode 56, are transferred. As a variant, the actuators 5 comprise only the layer 54.

The layer 54 that is located between the two electrodes is for example made of lead zirconate titanate (PZT). It may also be made of aluminum nitride (AlN), of zinc oxide (ZnO) or of any other suitable ferroelectric or piezoelectric material. The layer 54 may furthermore be thinned and adjusted to the desired thickness.

It is especially possible to use a commercially available piezoelectric ceramic, or to form the actuator 5 by depositing thin layers and patterning them on the plate 22, as described in patent FR3082997.

Figure 16:
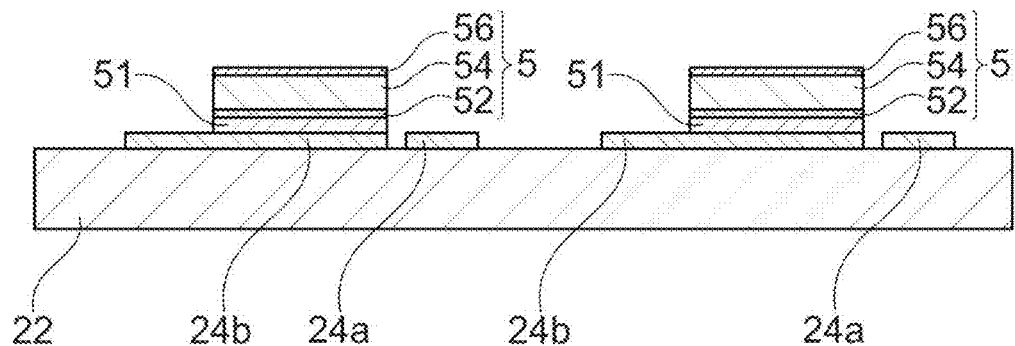

As illustrated in FIG. 16, the lower electrode 52 of the piezoelectric actuators 5 may be connected to the track 24 by virtue of a layer of conductive adhesive 51, a silver paste for example, for example of about 40 µm in thickness. The deformation of the piezoelectric layer 54 under the effect of a potential difference applied between the electrodes is transmitted to the plate 22 via a unimorphic effect in the layer 51.

Next, each actuator 5 is covered with an electrically insulating layer 58, which is for example made of a polymer, in order to keep the actuator 5 in place and to insulate the electrodes 52 and 56.

Figure 17:
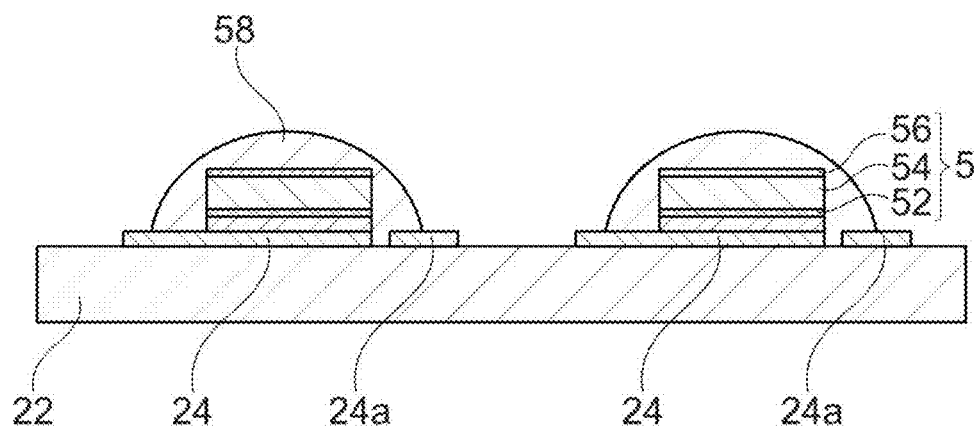

Only one portion of the supply track 24a remains uncovered, as illustrated in FIG. 17.

Figure 18:
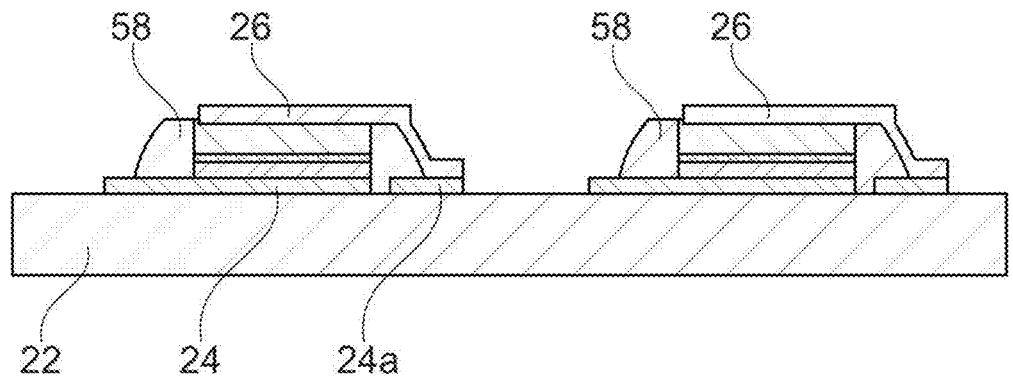

Next, the insulating layer 58 is thinned from above in order to uncover the electrode 56, with a view to depositing, by inkjet printing or another suitable method, a layer of conductive material 26 to connect the upper electrode 56 with the supply track 24a, as illustrated in FIG. 18.

As a variant, the insulating layer 58 and the piezoelectric layer 54 may be thinned to the desired thickness, then a layer of conductive material 26 forming both the upper electrode and the connection to the track 24a may be deposited. Where appropriate, the layer 26 is obtained using a stencil and sputtering gold, and its thickness is for example 300 nm.

The plate 22 may then be diced in order to obtain touch pixels 3 of the desired size, and equipped with the intended number of actuators 5.

The touch pixels 3 thus obtained may subsequently be transferred and fastened to a flexible substrate 4 with a view to forming a haptic structure 2, by following for example the production steps described below with reference to FIGS. 19 to 22. In particular, a haptic structure such as that described above with reference to FIG. 4 may be obtained by following the following steps.

Firstly, the touch pixels 3 are placed in the desired locations on a manufacturing carrier 100, for example a silicone plate, on which a flexible layer 42, for example of SINR polymer, which is intended for example to form the aforementioned covering layer, will have been formed beforehand, especially by lamination.

Figure 19:
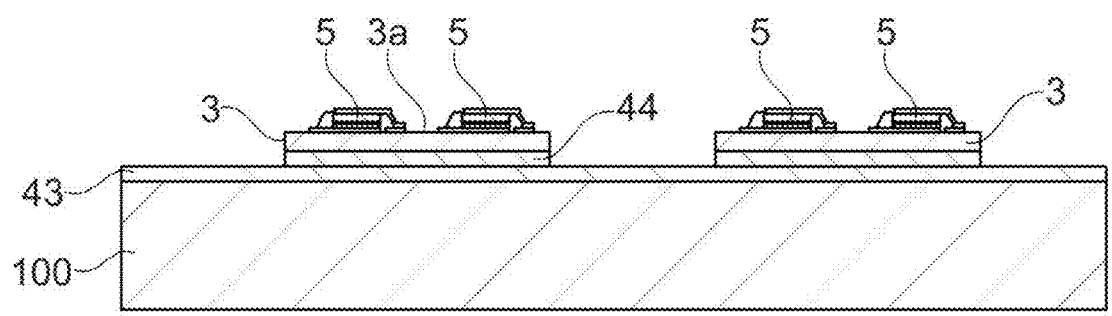

The touch pixels 3 are for example held in place by virtue of a layer 44 of stiff adhesive, an epoxy adhesive for example, for example of a thickness of 40 microns, as illustrated in FIG. 19.

Figure 20:
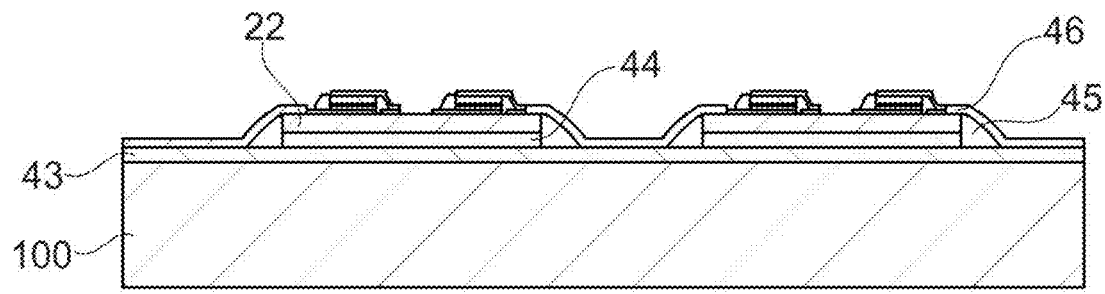

Subsequently, a layer of conductive material 46, for example a layer of gold of 300 nm thickness obtained by masking and sputtering, is deposited in order to form the electrical connection between each actuator 5 and the control circuit 6, such as illustrated in FIG. 20.

An insulating layer 45, such as for example a bead of polymer, may have been deposited around the touch pixels 3 beforehand.

Figure 21:
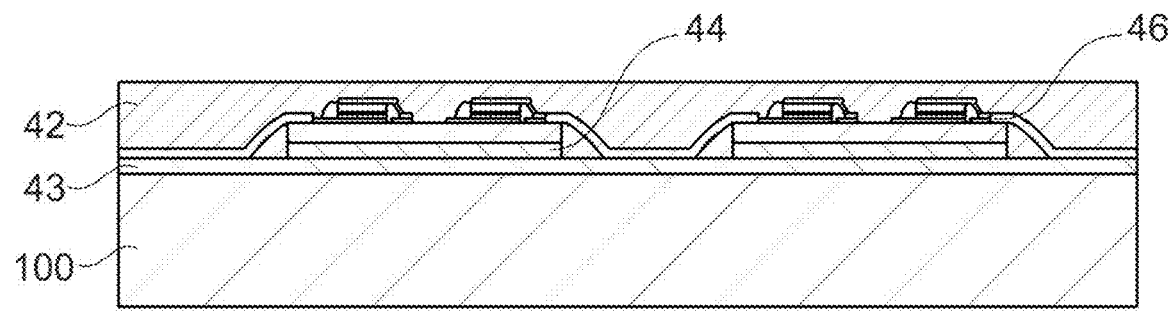
Figure 22:
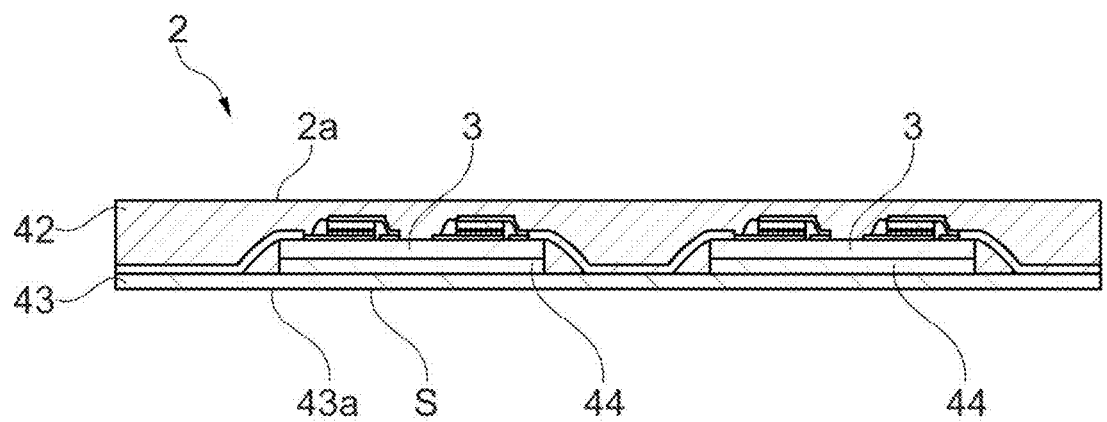

Next, for example by rolling or adhesive bonding, all of the touch pixels 3 and their actuators 5 are continuously covered with a layer 42, especially a film of soft polymer, in order to form flexible bridges between the touch pixels 3, as illustrated in FIG. 21. The layer 42 is intended to form the aforementioned receiving layer.

As a variant, the touch pixels 3 may be coated with a soft polymer.

Lastly, the manufacturing carrier is removed by peeling in order to uncover the covering layer 43, the uncovered surface defining the touch surface S of the flexible haptic interface. The touch surface may also, as a variant, be defined by the upper surface 2a of the haptic structure.

Figure 23A:
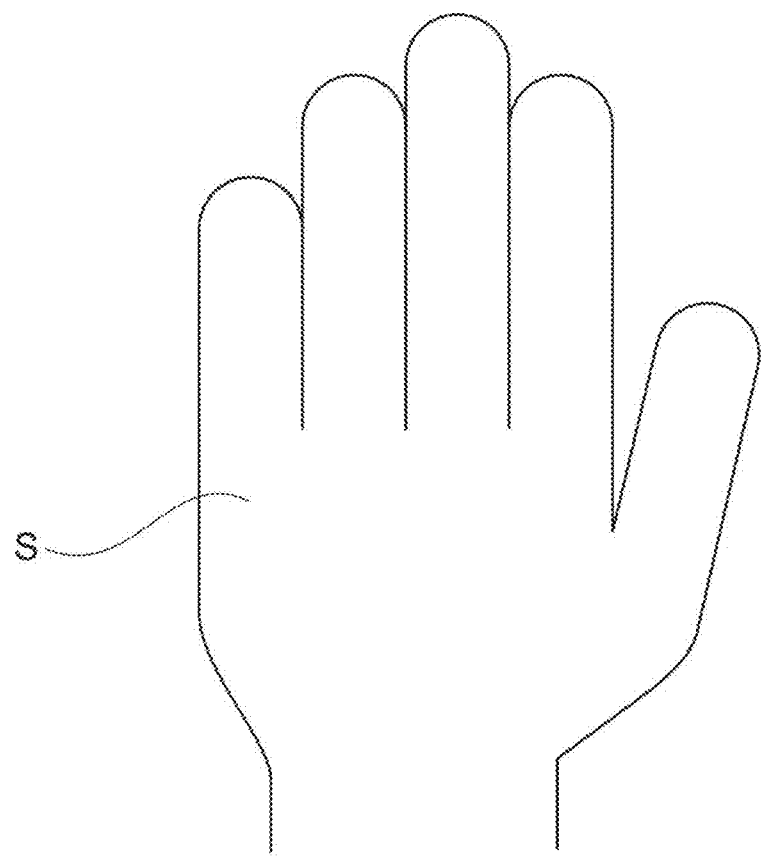
FIG. 23a shows an example of an article of clothing equipped with a flexible haptic interface according to the invention.

The interface 1 according to the invention may be integrated into an article of clothing, a glove for example, as illustrated in FIG. 23a.

Figure 23B:
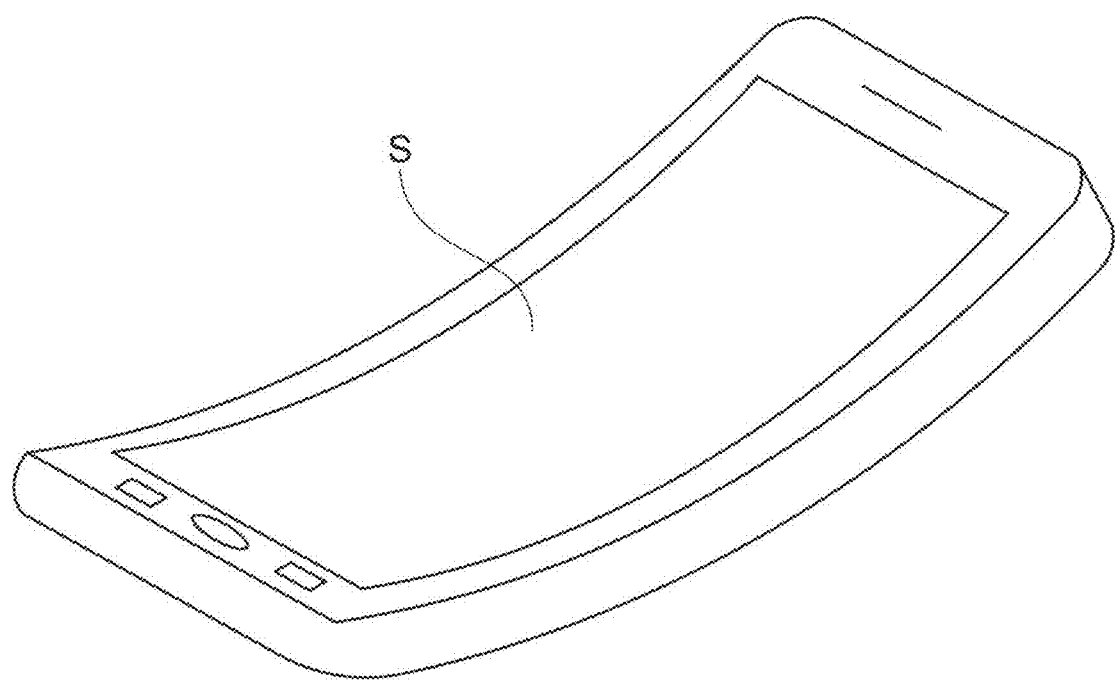
FIG. 23b illustrates an example of a mobile device equipped with a flexible haptic interface according to the invention.

It may as a variant be integrated into a mobile device, a flexible telephone for example, as illustrated in FIG. 23b.

Figure 24:
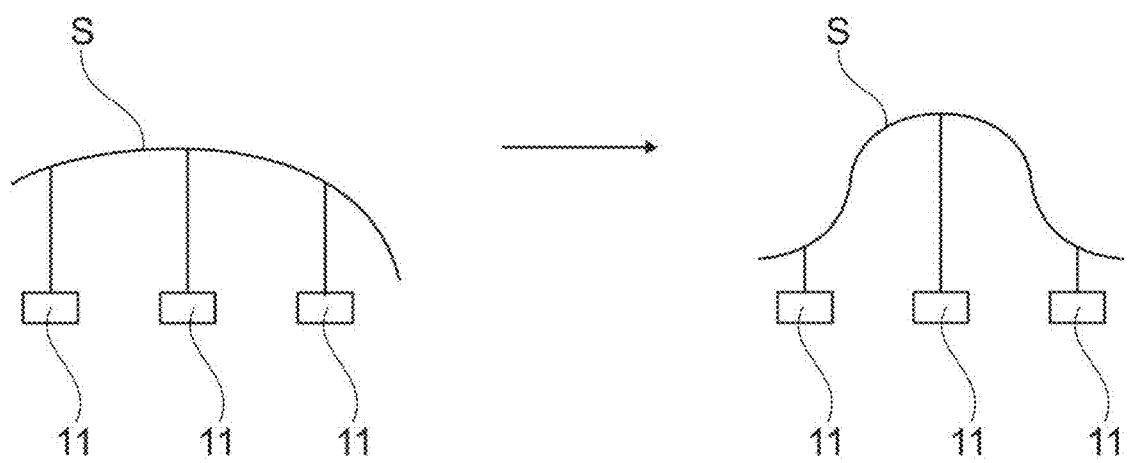
FIG. 24 illustrates the possibility of modifying the shape of the interface using actuators.

The haptic structure 2 may also, in other examples, change shape depending on the sought-after haptic effect, the interface 1 possibly, on account of its flexibility, being a reconfigurable tangible object, as illustrated in FIG. 24. In this figure, it may be seen that the interface may be mechanically coupled to one or more actuators 11 that allow it to be deformed in order to give it a predefined shape, corresponding to that of the object that it is sought to simulate tactilely.

The invention claimed is:

1. A flexible haptic interface, comprising:
    a haptic structure defining a touch surface touchable by a user, the haptic structure comprising:
        a plurality of stiff touch pixels borne by a flexible carrier,
        at least one actuator that makes contact with each pixel and that is arranged to transmit, to the pixel, a mechanical excitation that leads to an effect perceptible tactilely by the user.

2. The flexible haptic interface according to claim 1, comprising a control circuit configured to modulate the signals sent to the actuators in order to mechanically induce a vibration of the pixels and to generate a haptic sensation on the touch surface.

3. The process for manufacturing an interface as in claim 2, comprising:
    depositing a first layer made of flexible material, on a manufacturing carrier,
    fastening stiff pixels equipped with one or more actuators to the layer thus deposited, the actuators being placed on the exterior face of the pixels,
    electrically connecting each actuator to the control circuit,
    covering the pixels and actuators with a flexible material, and
    separating the assembly thus produced from the manufacturing carrier so as to uncover the lower face of the first layer.

4. The flexible haptic interface according to claim 1, wherein at least certain of the pixels have a substantially constant thickness comprised between 50 microns and 5 mm.

5. The flexible haptic interface according to claim 1, wherein the flexible carrier is being formed from a polymeric material.

6. The flexible haptic interface according to claim 1, wherein at least some of the pixels have an exterior surface that emerges onto the touch surface.

7. The interface according to claim 1, wherein the flexible carrier comprises a bearing layer and a layer for compensating for the thickness of the pixels, the pixels all being located on the same side of the bearing layer, the compensating layer comprising flexible segments extending between the pixels, the compensating layer being of substantially constant thickness.

8. The flexible haptic interface according to claim 7, wherein the pixels have an exterior surface that lies flush with the exterior surface of the compensating layer, the exterior surface of the pixels and that of the compensating layer defining the touch surface.

9. The flexible haptic interface according to claim 1, wherein the flexible carrier forms housings in which the pixels at least partially lie, the latter being continuously covered by a flexible sheet defining the touch surface.

10. The flexible haptic interface according to claim 1, wherein the spacing between two adjacent pixels is comprised between 10 microns and 5 mm.

11. The flexible haptic interface according to claim 1, wherein at least some of the pixels are arranged in rows and/or columns.

12. The flexible haptic interface according to claim 1, wherein each pixel is equipped with a plurality of actuators extending over at least one face of the pixel.

13. The flexible haptic interface according to claim 12, wherein the actuators are placed on either side of a median plane of the pixel at vibration nodes or anti-nodes.

14. The flexible haptic interface according to claim 1. comprising a system for detecting a contact of the user on the touch surface.

15. The flexible haptic interface according to claim 1, comprising a system allowing an image to be superposed at least partially on the touch surface.

16. The flexible haptic interface according to claim 1, comprising at least one actuator allowing the interface to be selectively shaped into at least two distinct shapes.

17. A method for generating at least one tactile perception capable of being felt by a user touching an interface as defined in claim 1, comprising:
    detecting the position of the contact of the user on a flexible touch surface of the interface by virtue of a detecting system,
    modulating, by virtue of a control circuit, the signals sent to the actuators depending on the detected position in order to mechanically induce a vibration of the pixels and to generate an effect perceptible tactilely by the user on the touch surface.

18. The method according to claim 17, the vibration of the pixels generating a variation in friction perceptible tactilely by a user moving his finger over the touch surface.

19. The method according to claim 17, the vibration of the pixels generating a pulse perceptible tactilely by a user exerting a static contact on the touch surface.

20. A process for manufacturing a touch pixel equipped with at least one piezoelectric actuator of an interface as defined in claim 1, comprising:
- depositing at least a first layer of a conductive material on the upper face of a stiff carrier,
- fastening piezoelectric actuators to the first layer thus formed so as to establish a first electrical connection with the actuators,
- depositing a layer of an insulator on the layers deposited beforehand,
- thinning the insulating layer in order to uncover the upper face of each piezoelectric actuator,
- depositing a layer of a conductive material on the actuators thus uncovered, so as to establish a second electrical connection with the actuators,
- dicing the stiff carrier so as to obtain pixels equipped with one or more piezoelectric actuators.

21. The flexible haptic interface according to claim 1, wherein the pixels are made of a material that is stiffer than that or those of the carrier.

22. The flexible haptic interface according to claim 1, wherein the ratio of the Young's modulus of each touch pixel to that of the carrier is higher than or equal to 8.

23. The flexible haptic interface according to claim 1, wherein the ratio of the Young's modulus of each touch pixel to that of the carrier is higher than or equal to 20.

24. The flexible haptic interface according to claim 1, wherein the ratio of the Young's modulus of each touch pixel to that of the carrier is higher than or equal to 50.

25. The flexible haptic interface according to claim 1, wherein at least some of the pixels are made of glass.

* * * * *